United States Patent
Dodge

(10) Patent No.: US 10,893,755 B2
(45) Date of Patent: Jan. 19, 2021

(54) DEVICE AND METHODS FOR REDUCING BACK INJURY

(71) Applicant: Solution Development Group LLC, Cottage Grove, MN (US)

(72) Inventor: Karl Dodge, Cottage Grove, MN (US)

(73) Assignee: Solution Development Group LLC, Cottage Grove, MN (US)

( * ) Notice: Subject to any disclaimer, the term of this patent is extended or adjusted under 35 U.S.C. 154(b) by 258 days.

(21) Appl. No.: 16/122,281

(22) Filed: Sep. 5, 2018

(65) Prior Publication Data

US 2019/0069681 A1    Mar. 7, 2019

Related U.S. Application Data

(60) Provisional application No. 62/554,360, filed on Sep. 5, 2017.

(51) Int. Cl.
| | | |
|---|---|---|
| *A47C 16/00* | (2006.01) | |
| *F16B 2/20* | (2006.01) | |
| *F16B 1/00* | (2006.01) | |
| *F16B 1/02* | (2006.01) | |

(52) U.S. Cl.
CPC .............. *A47C 16/005* (2013.01); *F16B 1/00* (2013.01); *F16B 1/02* (2013.01); *F16B 2/20* (2013.01); *F16B 2001/0028* (2013.01); *F16B 2001/0035* (2013.01)

(58) Field of Classification Search
CPC ......... A47C 16/00; A47C 16/005; F16B 1/00; F16B 1/02; F16B 1/20; F16B 2001/0028; F16B 2001/0035; B25H 5/00
See application file for complete search history.

(56) References Cited

U.S. PATENT DOCUMENTS

| | | | | |
|---|---|---|---|---|
| 3,677,569 | A * | 7/1972 | Larson | B62B 3/02 280/32.6 |
| 5,494,305 | A * | 2/1996 | Chen | B25H 5/00 280/32.6 |
| 7,007,328 | B1* | 3/2006 | Bailey | A47C 9/027 5/632 |
| 8,413,275 | B1* | 4/2013 | Yates | A47C 16/005 5/652 |
| 8,505,138 | B1* | 8/2013 | Minichiello | A47C 16/00 5/632 |
| 9,486,914 | B1* | 11/2016 | Frolander | A47C 16/005 |
| 10,646,046 | B1* | 5/2020 | Tilton | B65D 25/04 |
| 2001/0024022 | A1* | 9/2001 | Antirose | B25H 5/00 280/32.6 |
| 2005/0051980 | A1* | 3/2005 | Melvin | B25H 5/00 280/32.6 |

(Continued)

*Primary Examiner* — Robert G Santos
*Assistant Examiner* — Rahib T Zaman
(74) *Attorney, Agent, or Firm* — Lewis Rice LLC

(57) ABSTRACT

A backsaving device having a main body sized and shaped to corresponding to the height of an under-sink cabinet, such that when the backsaving device is disposed adjacent the under-sink cabinet, a top surface of said main body is generally coplanar with a bottom interior of said under-sink cabinet. This allows a worker working under the sink to lay back on the device comfortably without the edge of the cabinet digging into the back or shoulders. A rotatably flip may be used to bridge the gap between the device and sink to prevent pinching.

18 Claims, 1 Drawing Sheet

(56) References Cited

U.S. PATENT DOCUMENTS

| | | | |
|---|---|---|---|
| 2007/0176378 A1* | 8/2007 | Bangs | B25H 5/00 280/32.6 |
| 2011/0049822 A1* | 3/2011 | Hinman | B25H 5/00 280/32.6 |
| 2011/0227303 A1* | 9/2011 | Gering | B25H 1/04 280/32.6 |
| 2014/0027990 A1* | 1/2014 | Triglia | B62B 3/00 280/32.6 |

* cited by examiner

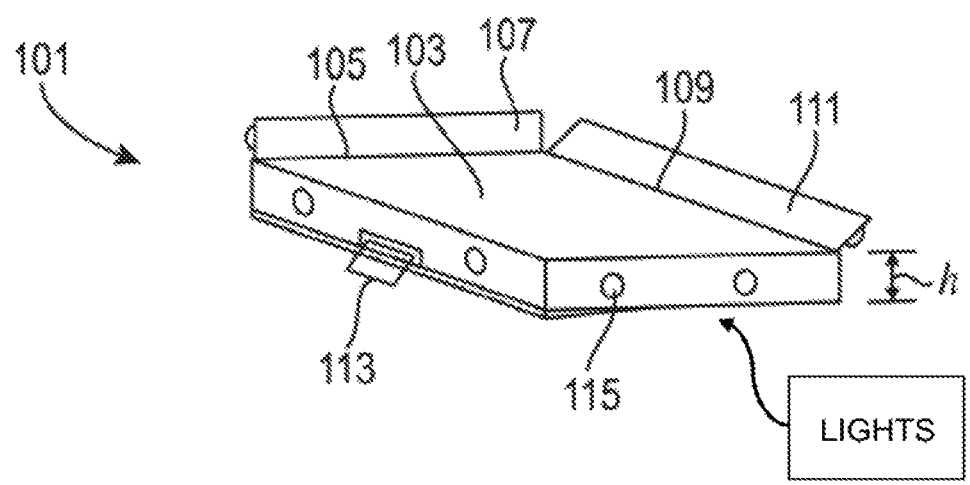

DEVICE AND METHODS FOR REDUCING BACK INJURY

CROSS-REFERENCE TO RELATED APPLICATIONS

This application claims benefit of U.S. Provisional Application Ser. No. 62/554,360, filed Sep. 5, 2017, the entire disclosure of which is incorporated herein by reference.

BACKGROUND OF THE INVENTION

Field of the Invention

This disclosure is related to the field of home repair, and more particularly to a device and method for inhibiting back pain and injury.

Description of the Related Art

Anybody who has ever fixed a leaking faucet knows that dealing with basic plumbing problems is literally a pain in the neck and back. Plumbing, by its nature, relies upon the force of gravity to draw water from where it is stored, such as sinks, toilets, and bathtubs, down through piping to storm drains and sewage lines, where the water is directed to treatment plants and eventually reintroduced to the environment. Because of this, the majority of the plumbing fixtures in a home are located below sinks or floors. This means that a plumber working on a typical plumbing project must lay on his or her back in an uncomfortable position in order to see and work on the plumbing.

While this sometimes is not a problem, particularly in an unfinished basement where the plumbing fixtures are overhead and the plumber can simply stand on a ladder, in many residential and commercial settings, plumbing fixtures are hidden within cabinetry beneath the sinks. Because the inside of the cabinet is elevated from the floor, the plumber is forced into the uncomfortable position of laying on his or her back across the corner of the cabinet edge.

These and other work-related risks can result in chronic back pain and injury for plumbers and other professionals in skilled labor. In a 2003 report, the Bureau of Labor Statistics estimated that there were 4.4 million private industry cases of non-fatal work-related injuries and illnesses and, of these, more than 50 percent resulted in lost time from work, transfer to a different job, or limited work activity. By some estimates, as many as 880,000 of these cases are related to back pain or back injuries.

SUMMARY OF THE INVENTION

The following is a summary, of the invention in order to provide a basic understanding of some aspects of the invention. This summary is not intended to identify key or critical elements of the invention or to delineate the scope of the invention. The sole purpose of this section is to present some concepts of the invention in a simplified form a prelude to the more detailed description that is presented later.

Because of these and other problems in the art, described herein, among other things, is A backsaving device comprising: a main body generally in the configuration of a rectangular prism, the main body having a height such that when the backsaving device is disposed adjacent to an under-sink cabinet, a top surface of the main body is generally coplanar with a bottom interior of the under-sink cabinet; a first flap rotatably attached at an edge of the first flap to a first top edge of the main body, the first flap rotatable from a position adjacent the top surface to a position adjacent a first side of the main body, the first side being perpendicularly adjacent to the top surface; a means for removeably attaching the first flap to the first side; a second flap rotatably attached at an edge of the second flap to a second top edge of the main body, the second flap rotatable from a position adjacent the top surface to a position adjacent a second side of the main body, the second side being perpendicularly adjacent the top surface; a means for removeably attaching the second flap to the second side; a carrying handle disposed on a side of the main body; and at least one storage compartment disposed within the main body; wherein the first flap is generally in the configuration of a rectangle and the first flap edge has a length about the same as a length of the first top edge; and wherein the second flap is generally in the configuration of a rectangle and the second flap edge has a length about the same as a length of the second top edge.

In an embodiment of the backsaving device, the first flap is removable.

In another embodiment of the backsaving device, the second flap is removable.

In another embodiment of the backsaving device, the top surface comprises padding.

In another embodiment of the backsaving device, the padding comprises contouring sized and shaped such that when the main body is adjacent an under-sink cabinet and a human is disposed on the main body in a position to work under the cabinet, the contouring conforms to the shape of the human in the position.

In another embodiment of the backsaving device, the padding is removable.

In another embodiment of the backsaving device, the first flap comprises padding.

In another embodiment of the backsaving device, the second flap comprises padding.

In another embodiment of the backsaving device, the means for attaching the first flap to the first side is selected from the group consisting of: a hook-and-loop system, a clip, a snap, and a hook.

In another embodiment of the backsaving device, the means for attaching the second flap to the second side is selected from the group consisting of: a hook-and-loop system, a clip, a snap, and a hook.

In another embodiment of the backsaving device, the at least one storage compartment comprises a drawer.

In another embodiment of the backsaving device, at least part of the main body is magnetized.

In another embodiment of the backsaving device, at least part of the main body is magnetized.

In another embodiment of the backsaving device, the at least one storage compartment is disposed in the main body such that when the main body is adjacent an under-sink cabinet and a human is disposed on the main body in a position to work under the cabinet, the at least one storage compartment is sized and shaped such that the human can reach the storage compartment from the position.

In a another embodiment of the backsaving device, the first flap is generally in the configuration of a rectangle and the first flap edge has a length about the same as a length of the first top edge; and the second flap is generally in the configuration of a rectangle and the second flap edge has a length about the same as a length of the second top edge.

In another embodiment of the backsaving device, the device further comprises at least one source of illumination.

In another embodiment of the backsaving device, the at last one source of illumination comprises an electric light.

In another embodiment of the backsaving device, the electric light is disposed in the main body.

In another embodiment of the backsaving device, the device further comprises a retractable member and the electric light is disposed in the retractable member.

In another embodiment of the backsaving device, the light comprises a snake light.

BRIEF DESCRIPTION OF THE DRAWINGS

FIG. 1 depicts a perspective view of an embodiment of the invention according to the present disclosure.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Because of these and other problems in the art, described herein, among other things, are device and methods for the reduction of back pain or back injury. FIG. 1 depicts an embodiment of a device according to the present disclosure. In the depicted embodiment of FIG. 1, the device has a main body 101 generally in the configuration of a rectangular prism, with a height H configured to approximately match the typical height of the bottom of an under-sink cabinet in a typical commercial or residential setting. By current standards, this is typically around six inches, but this may vary from country to country, or from embodiment to embodiment. The top 103 of the main body 101 may be padded with a comfortable or soft fabric or material, which cushions the user when laying upon it, as described elsewhere herein. The length and width of the main body 101 are generally configured to accommodate the upper torso of an adult human. Ergonomically, dimensions of 18 inches by 24 inches are typically able to accommodate the majority of adults.

On at least one of the sides 105 of the main body 101 there is attached to the main body 101 a first flap 107. In the depicted embodiment, the first flap 107 is padded with a material similar to that located on the top 103 of the main body 101, and the flap 107 is rotatably connected to a top edge of the main body 101. This rotation allows for a range of motion, allowing the flap 107 to be placed on top 103 of the main body 101, such that the two padded surfaces are in contact, or rotated 270 degrees so that the opposing bottom side of the flap 107 is adjacent to the vertical short side of the main body 101. The flap 107 may, in an embodiment, include an attaching means which allows the flap 107 to be fixed to the side of the main body 101. In the depicted embodiment, this attaching means is a strip of Velcro™ or other hook-and-loop system. Other attaching means, such as clips, snaps, hooks, or other attaching means known in the art may be substituted in an embodiment. On a second side 109 of the main body 101, a second flap 111 is also attached to the main body 101. This attachment may be in the same general fashion as in the first flap 107, running the length of a long side 109 of the main body 101. The second flap 111 may also contain a Velco™ connection or other attaching means for affixing it 111 to the long side 109 of the main body 101. For both the first 107 and second 111 flaps, the flaps 109 and 111 generally are in the configuration of a rectangular surface with a length approximately the same as the dimension of the side 105 or 109 to which it is attached.

To use the device, the device is placed adjacent to an open cabinet, and the side 105 or 109 of the main body 101 having a flap 107 or 111 is placed at the outer edge of the cabinet base. The flap 107 or 111 is lifted up as the main body 101 is pushed next to the open cabinet and the flap 107 or 111 is placed over the gap between the main body 101 and the open cabinet to cover the gap and provide a comfortable resting place for the user's back without risk of pinching if the device moves during use. This provides an elevated surface for the user's back and shoulders while the head and neck are fully or partially located within the cabinet in order to work on the plumbing. The padded top 103 reduces back and neck strain by providing such a surface. Typically, a parallelepiped configuration is preferred because the user's upper torso will be located on the device, and usually stabilize him or herself with his or her feet. However, in an alternative embodiment, the device may have a wedge shape, declining from the cabinet base to a lower elevation distal the cabinet.

In an embodiment, the device may further comprise a carrying handle 113. In a depicted embodiment, this handle 113 is disposed on a side of the main body 101. It is preferably disposed on the long side 109 of the main body 101 so that if the device is carried by the handle 113 it does not bump against the knees or drag on the ground. The handle 113 may be a fold-under or other stowable handle of a type known in the art. The handle 113 may also be removable.

In an embodiment, the device may comprise one or more storage compartments within the main body 101 or magnets 115 disposed along a side of the main body 101. Such storage compartments or magnets 115 may be used to hold tools or fasteners within reaching distance. These storage compartments and/or magnets 115 may be disposed at a distance or location along the side of the main body 101 such that when the device is in use, and the user drops his or her hand to the side of the device, the storage compartment or magnet 115 is disposed at a natural resting place of the user's hand.

When not in use, the flaps 107 and 111 can be attached to the sides 105 and 109 for easy storage. In a still further embodiment, the device may contain clips, drawers, or other storage compartments or device beneath or within the device to allow for the user to carry commonly used plumbing tools to the site without having to additionally bring along a separate toolbox. In a still further embodiment, the device may comprise one or more lights embedded in the device on the top or sides and positioned at an angle to project light into the cabinet when the device is positioned at the edge of an open kitchen cabinet. In a still further embodiment, these lights may be on retractable or extendable and flexible poles, such as snake lights.

The manner of making and using the described device will be readily apparent to one of ordinary skill in the art. The device may be manufactured from any material ranging from wood to aluminum to other composites, plastics or metals. The manner of construction and making such a device is well within the skill of one of ordinary skill in the art. The top 103 padded surface is preferably made from a reusable, replaceable, and/or washable material, such as a fabric, moisture resistant, moisture repelling, or rubber material, to inhibit the accumulation of sweat, water, debris, or other foulants that can impart an unpleasant odor. In an embodiment, the fabric and/or flaps are removable or replaceable (e.g., removeably affixed to the main body 101) so that if the padding is worn out or reduced in effectiveness over time, it can be easily or inexpensively replaced. This may be done, for example, by Velcroing™ or otherwise snapping or temporarily attaching the flaps 107 and 111 and/or padding to the main body 101.

In a still further embodiment, the configuration of the main body may not be a rectangular prism, but may include depressions or other contours designed to roughly match the contour of an upper human torso. Such an embodiment may impart greater comfort to the worker. Additionally, such contouring may provide additional support for key elements of the back, such as lumbar support.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A backsaving device comprising:
    a main body generally in the configuration of a rectangular prism, said main body having a height such that when said backsaving device is disposed adjacent to an under-sink cabinet, a top surface of said main body is generally coplanar with a bottom interior of said under-sink cabinet;
    a first flap rotatably attached at an edge of said first flap to a first top edge of said main body, said first flap rotatable from a position adjacent said top surface to a position adjacent a first side of said main body, said first side being perpendicularly adjacent to said top surface:
    a means for removeably attaching said first flap to said first side;
    a second flap rotatably attached at an edge of said second flap to a second top edge of said main body, said second flap rotatable from a position adjacent said top surface to a position adjacent a second side of said main body, said second side being perpendicularly adjacent said top surface;
    a means for removeably attaching said second flap to said second side;
    a carrying handle disposed on a side of said main body; and
    at least one storage compartment disposed within said main body;
    wherein said first flap is generally in the configuration of a rectangle and said first flap edge has a length about the same as a length of said first top edge; and
    wherein said second flap is generally in the configuration of a rectangle and said second flap edge has a length about the same as a length of said second top edge.

2. The backsaving device of claim 1, wherein said first flap is removable.

3. The backsaving device of claim 1, wherein said second flap is removable.

4. The backsaving device of claim 1, wherein said top surface comprises padding.

5. The backsaving device of claim 4, wherein said padding comprises contouring sized and shaped such that when said main body is adjacent an under-sink cabinet and a human is disposed on said main body in a position to work under said cabinet, said contouring conforms to the shape of said human in said position.

6. The backsaving device of claim 4, wherein said padding is removable.

7. The backsaving device of claim 1, wherein said first flap comprises padding.

8. The backsaving device of claim 1, wherein said second flap comprises padding.

9. The backsaving device of claim 1, wherein said means for attaching said first flap to said first side is selected from the group consisting of: a hook-and-loop system, a clip, a snap, and a hook.

10. The backsaving device of claim 1, wherein said means for attaching said second flap to said second side is selected from the group consisting of: a book-and-loop system, a clip, a snap, and a hook.

11. The backsaving device of claim 1, wherein said at least one storage compartment comprises a drawer.

12. The backsaving device of claim 1, wherein at least part of said main body is magnetized.

13. The backsaving device of claim 1, wherein at least storage compartments is disposed in said main body such that when said main body is adjacent an under-sink cabinet and a human is disposed on said main body in a position to work under said cabinet, said at least one storage compartment is sized and shaped such that said human can reach said storage compartment from said position.

14. The backsaving device of claim 1, further comprising at least one source of illumination.

15. The backsaving device of claim 14, wherein said at least one source of illumination comprises an electric light.

16. The backsaving device of claim 15, wherein said electric light is disposed in said main body.

17. The backsaving device of claim 15, further comprising a retractable member, wherein said electric light is disposed in said retractable member.

18. The backsaving device of claim 15, wherein said light comprises a snake light.

* * * * *